(12) United States Patent
Shih

(10) Patent No.: US 10,568,186 B2
(45) Date of Patent: Feb. 18, 2020

(54) SIGNAL TRANSMISSION DEVICE, SIGNAL TRANSMISSION METHOD AND SMART LAMP SYSTEM

(71) Applicants: Inventec (Pudong) Technology Corporation, Shanghai (CN); INVENTEC CORPORATION, Taipei (TW)

(72) Inventor: Chen-Hsiang Shih, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 0 days.

(21) Appl. No.: 16/166,822

(22) Filed: Oct. 22, 2018

(65) Prior Publication Data

US 2019/0364647 A1 Nov. 28, 2019

(30) Foreign Application Priority Data

May 25, 2018 (CN) .......................... 2018 1 0516624

(51) Int. Cl.
*H05B 37/02* (2006.01)
*H04L 12/10* (2006.01)
*H02M 7/04* (2006.01)

(52) U.S. Cl.
CPC ......... *H05B 37/0263* (2013.01); *H04L 12/10* (2013.01); *H02M 7/04* (2013.01)

(58) Field of Classification Search
None
See application file for complete search history.

(56) References Cited

U.S. PATENT DOCUMENTS

| 7,737,573 | B2 * | 6/2010 | Phan | H02J 1/10 |
| | | | | 307/1 |
| 7,761,719 | B2 * | 7/2010 | Ghoshal | H04L 12/10 |
| | | | | 713/300 |
| 7,821,684 | B2 * | 10/2010 | Shih | H04N 1/03 |
| | | | | 358/443 |
| 9,048,666 | B2 * | 6/2015 | Su | H02J 7/0013 |
| 9,325,516 | B2 * | 4/2016 | Pera | H04L 12/2803 |
| 9,720,473 | B2 * | 8/2017 | Chong | H04L 12/10 |
| 10,051,715 | B2 * | 8/2018 | Hick | H05B 33/0857 |
| 10,165,656 | B2 * | 12/2018 | Snyder | H04L 12/10 |
| 10,194,507 | B2 * | 1/2019 | Snyder | H04L 12/10 |
| 10,361,583 | B2 * | 7/2019 | Crenshaw | H02J 7/0021 |
| 2003/0202223 | A1 * | 10/2003 | Shih | H04N 1/03 |
| | | | | 358/475 |
| 2007/0182593 | A1 * | 8/2007 | Shih | H04N 1/03 |
| | | | | 341/13 |

(Continued)

*Primary Examiner* — Alexander H Taningco
*Assistant Examiner* — Srinivas Sathiraju
(74) *Attorney, Agent, or Firm* — Muncy, Geissler, Olds & Lowe, P.C.

(57) ABSTRACT

A signal transmission device includes an Ethernet connection port, a magnetic circuit and a power transmission circuit. The Ethernet connection port is configured to be electrically connected to a set of signal equipment and to receive a power signal and a data signal provided by and to output the data signal to a system circuit via a second port. The power transmission circuit is configured to convert a supplying power of the power signal into a DC device power and to output a first power to the system circuit and a second power to the smart device according to the DC device power.

5 Claims, 5 Drawing Sheets

(56) References Cited

U.S. PATENT DOCUMENTS

| | | | | |
|---|---|---|---|---|
| 2008/0290729 | A1* | 11/2008 | Schoenberg | H04B 3/36 307/3 |
| 2009/0309420 | A1* | 12/2009 | Phan | H02J 1/10 307/43 |
| 2013/0147367 | A1* | 6/2013 | Cowburn | H05B 37/0254 315/152 |
| 2014/0229184 | A1* | 8/2014 | Shires | H04L 12/12 704/275 |
| 2015/0254570 | A1* | 9/2015 | Florence et al. | G06N 7/005 706/52 |
| 2015/0323968 | A1* | 11/2015 | Chong | H04L 12/10 713/310 |
| 2015/0380932 | A1* | 12/2015 | Karle | H02J 3/14 307/29 |
| 2016/0124477 | A1* | 5/2016 | Guy | H04L 12/10 713/300 |
| 2016/0172866 | A1* | 6/2016 | Weaver, Jr. | H01R 13/6675 307/31 |
| 2016/0183351 | A1* | 6/2016 | Snyder | H04L 12/10 315/152 |
| 2016/0294492 | A1* | 10/2016 | Mostofi | H04B 17/318 |
| 2017/0271914 | A1* | 9/2017 | Crenshaw | H02J 7/0021 |
| 2017/0357300 | A1* | 12/2017 | Chong | H04L 12/10 |
| 2018/0294982 | A1 | 1/2018 | Boemi et al. | |
| 2018/0062397 | A1* | 3/2018 | Singh | H01F 38/14 |
| 2018/0109147 | A1* | 4/2018 | Meng | H02J 50/12 |
| 2018/0167223 | A1* | 6/2018 | Pratap | G06F 1/26 |
| 2018/0238971 | A1* | 8/2018 | Bennett | H04L 12/10 |
| 2018/0279429 | A1* | 9/2018 | Snyder | H05B 33/08 |
| 2019/0013687 | A1* | 1/2019 | Shevde | H02J 7/0055 |
| 2019/0123588 | A1* | 4/2019 | Kim | H02J 50/12 |
| 2019/0182933 | A1* | 6/2019 | Lu | H05B 37/0272 |
| 2019/0191518 | A1* | 6/2019 | Guan | H05B 33/0809 |
| 2019/0212001 | A1* | 7/2019 | Shi | H05B 33/0842 |
| 2019/0215935 | A1* | 7/2019 | Trublowski | H01Q 1/2216 |

\* cited by examiner

SIGNAL TRANSMISSION DEVICE, SIGNAL TRANSMISSION METHOD AND SMART LAMP SYSTEM

CROSS-REFERENCE TO RELATED APPLICATIONS

This non-provisional application claims priority under 35 U.S.C. § 119(a) on Patent Application No(s). 201810516624.7 filed in China on May 25, 2018, the entire contents of which are hereby incorporated by reference.

TECHNICAL FIELD

The disclosure relates to a signal transmission device, a signal transmission method and a smart lamp system, more particularly to a signal transmission device, a signal transmission method and a smart lamp system using techniques of Ethernet transmission.

BACKGROUND

With development of technologies, a smart city will become a trend in the future. For a smart city, a smart lamp device plays an important role in a whole smart system. Conventionally, lamps included in the smart lamp device operate based on power provided by a DC-In Adaptor. However, in general, the DC-In Adaptor is placed outdoor. In order to prevent from wet and dust, an extra case is required for protecting the DC-In Adaptor so as to prevent the DC-In Adaptor from malfunctions caused by damages brought by the wet and the dust.

Furthermore, it is necessary to provide a space to accommodate the DC-In Adaptor. For the above reasons, costs for maintaining the conventional smart lamp device equipped with the DC-In Adaptor are inevitable, and the wastes of spaces are caused. Therefore, it is an important issue in the relevant field to overcome inconveniences and defects brought by the conventional smart lamp device equipped with the DC-In Adaptor.

SUMMARY

A signal transmission device is disclosed according to one embodiment of the present disclosure. The signal transmission device includes an Ethernet connection port, a magnetic circuit and a power transmission circuit. The Ethernet connection port is configured to receive a power signal and a data signal provided by the set of signal equipment. The magnetic circuit is configured to output the power signal via a first port and to output the data signal to a system circuit via a second port. The power transmission circuit is configured to convert a supplying power of the power signal into a DC device power. The power transmission circuit is configured to output a first power to the system circuit and to output a second power to the smart device according to the DC device power. Wherein, a voltage of the supplying power is greater than a voltage of the first power and a voltage of the second power, and the data signal is sent from the system circuit to the smart device.

A signal transmission method is disclosed according to one embodiment of the present disclosure. The signal transmission method includes the following steps: receiving a power signal and a data signal from a set of signal equipment by an Ethernet connection port; outputting the power signal via a first port by a magnetic circuit and outputting the data signal to a system circuit via a second port by the magnetic circuit; converting a supplying power of the power signal into a DC device power by a power transmission circuit and outputting a first power and a second power to the system circuit and a smart device respectively according to the DC device power by the power transmission circuit; wherein a voltage of the supplying power is greater than a voltage of the first power and a voltage of the second power, and the data signal is sent from the system circuit to the smart device.

A smart lamp system is disclosed according to one embodiment of the present disclosure. The smart lamp system includes a set of signal equipment, a signal transmission device, a system circuit and a smart lamp device. The set of signal equipment is configured to provide a first data signal and a power signal having a supplying power. The signal transmission device is electrically connected to the set of signal equipment. The signal transmission device includes an Ethernet connection port, a magnetic circuit and a power transmission circuit. The Ethernet connection port is configured to be electrically connected to the set of signal equipment and to receive the power signal and the first data signal provided by the set of signal equipment. The magnetic circuit is electrically connected to the Ethernet connection port and has a first port and a second port. The magnetic circuit is configured to output the power signal via the first port and to output the first data signal via the second port. The power transmission circuit is electrically connected to the first port and configured to convert the supplying power of the power signal into a DC device power. The power transmission circuit is configured to output a first power and a second power according to the DC device power. The system circuit is electrically connected to the power transmission circuit and the second port. The system circuit is configured to operate according to the first power and to receive the first data signal via the second port. The smart lamp device is electrically connected to the power transmission circuit and the system circuit. The smart lamp device includes at least one light-emitting element and a camera. The smart lamp device is configured to operate according to the second power and to receive the first data signal from the system circuit to control the camera.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
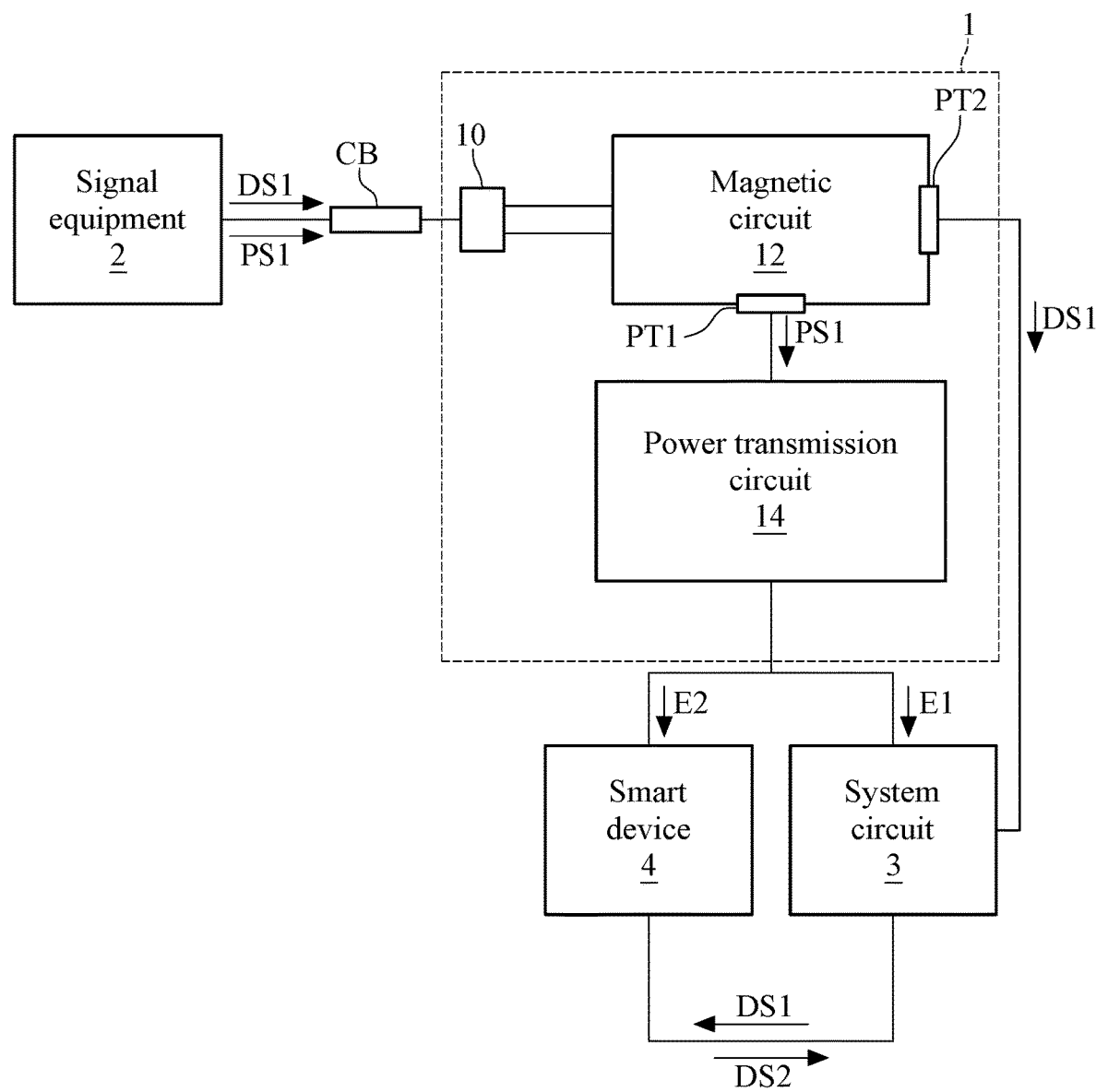
FIG. 1 is a block diagram of a signal transmission device according to one embodiment of the present disclosure.

Please refer to FIG. 1, which is a block diagram of a signal transmission device according to one embodiment of the present disclosure. As shown in FIG. 1, the signal transmission device 1 includes an Ethernet connection port 10, a magnetic circuit 12 and a power transmission circuit 14. The Ethernet connection port 10 is configured to be electrically connected to a set of signal equipment 2 and receive a power signal PS1 and a first data signal DS1 provided by the set of signal equipment 2. Specifically, the Ethernet connection port 10 receives the power signal PS1 and the first data signal DS1 from the set of signal equipment 2 via an Ethernet transmission cable CB. In an example, the set of signal equipment 2 is a power-sourcing equipment (PSE) which includes a power supply, a voltage converter (e.g. a boost converter), etc. The set of signal equipment 2 is configured to acquire power from an external power source and provide necessary power to circuits in the system or external devices by performing proper voltage transformations. However, the present disclosure is not limited to the above examples.

The magnetic circuit 12 is electrically connected to the Ethernet connection port 10 and the magnetic circuit 12 has a first port PT1 and a second port PT2. The magnetic circuit 12 is configured to output the power signal PS1 via the first port PT1 and the magnetic circuit 12 outputs the first data signal DS1 to a system circuit 3 via the second port PT2. The power transmission circuit 14 is electrically connected to the first port PT1, the system circuit 3 and the smart device 4. The power transmission circuit 14 is configured to convert a supplying power of the power signal PS1 into a DC device power DVQ, and output a first power E1 to the system circuit 3 and outputs a second power E2 to a smart device 4 according to the DC device power DVQ. In an implementation, the magnetic circuit 12 is a Magnetics Module with a type number of VP6014M.

Figure 2:
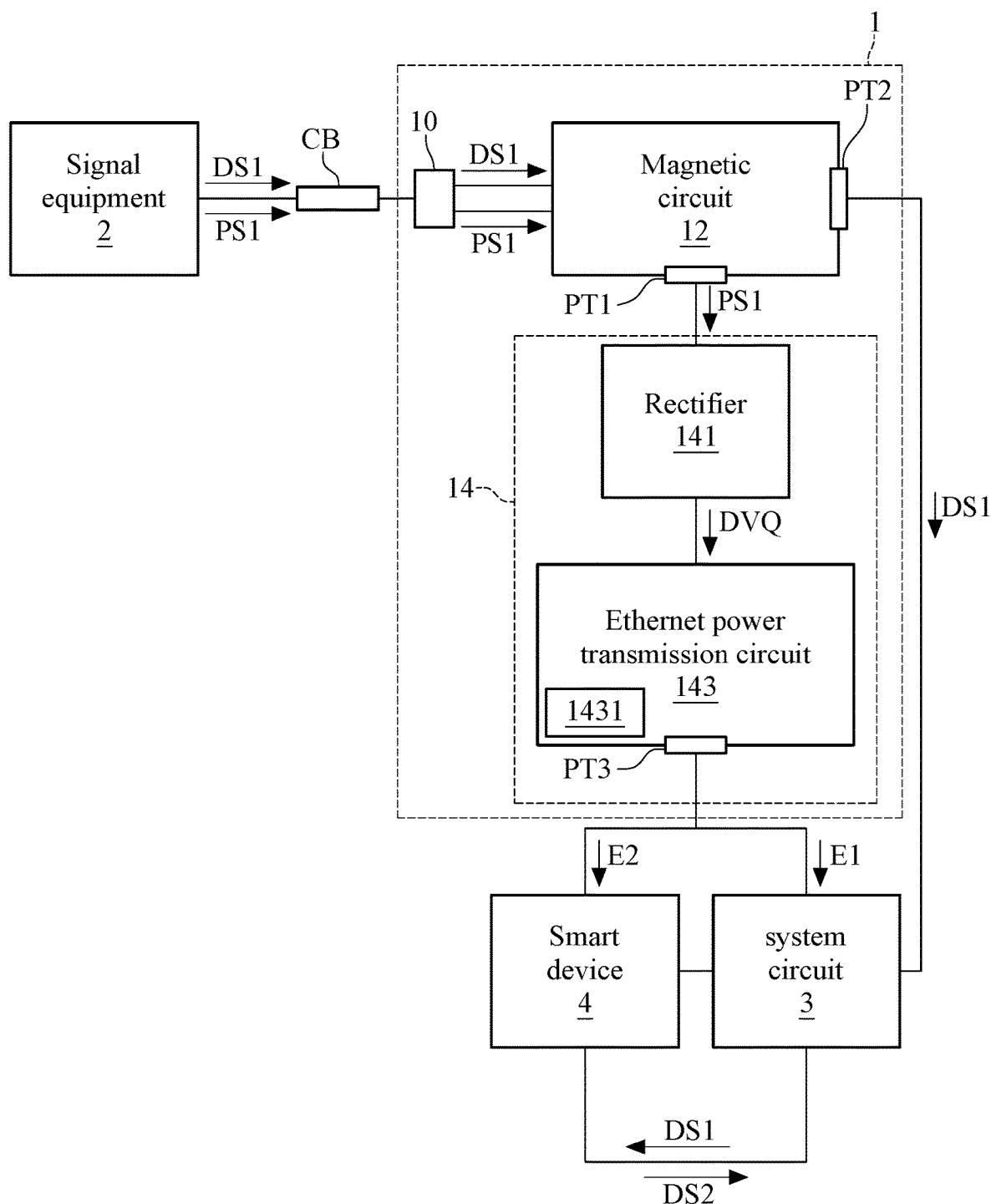
FIG. 2 is a detailed block diagram of the signal transmission device according to the embodiment of FIG. 1.

Please refer to FIG. 2, which is a detailed block diagram of the signal transmission device according to the embodiment of FIG. 1. In this embodiment, the power transmission circuit 14 includes a rectifier 141 and an Ethernet power transmission circuit 143. The rectifier 141 is electrically connected to the first port PT1 and configured to convert the supplying power into the DC device power DVQ by performing a rectification process. Specifically, the rectifier 141 outputs the DC device power DVQ which is adapted to a general system or a general device by rectifying the supplying power. In an implementation, the Ethernet connection port 10 is a port RJ45 Jack, and the rectifier 141 a bridge rectifier. However, the present disclosure is not limited to the above example. The Ethernet power transmission circuit 143 is electrically connected to the rectifier 141, and the Ethernet power transmission circuit 143 has an outputting port PT3 and a transformer 1431. The transformer 1431 is configured to transform the DC device power DVQ by performing a buck-conversion so that the first power E1 and the second power E2 are generated. The Ethernet power transmission circuit 143 outputs the first power E1 and the second power E2 to the system circuit 3 and the smart device 4 respectively via the outputting port PT3.

More specifically, the Ethernet power transmission circuit 143 is capable of assigning part of or all of electric power (watts) included in the DC device power DVQ separately to the first power E1 and the second power E2, serving as operation power to the system circuit 3 and the smart device 4 respectively. In practice, the source of the DC device power DVQ is the supplying power which voltage is greater than the voltage of the first power E1 and the voltage of the second power E2. For example, the supplying power from the set of signal equipment 2 has the voltage of 48 volts, and both of first power E1 and the second power E2, outputted by the Ethernet power transmission circuit 143, have the voltages of 12 volts. The voltage values given in the above example are merely used for illustration. In an implementation, the actual voltage values may vary due to the system circuit and the smart device. In this embodiment, a sum of the wattages of the first power E1 and the wattages of the second power E2 is less than or equal to the wattages of the DC device power DVQ. For example, the DC device power DVQ from the set of signal equipment 2 is electric power of 30 watts, and the Ethernet power transmission circuit 143 may acquire electric power of 15 watts and electric power of 12 watts from the DC device power DVQ of 30 watts, with the electric power of 15 watts and electric power of 12 watts serving as the first power E1 and the second power E2 respectively. The wattages values given above are merely used for illustration, and the present disclosure is not limited to the above example. In practice, the wattages values vary due to the types of the system circuit and the smart device. In an example, as shown in FIG. 2, the smart device 4 not only receives the second power E2 from the Ethernet power transmission circuit 143, but also receives another power provided by the system circuit 3.

In this embodiment, the first data signal DS1 is related to the operation of the smart device 4. Specifically, in an example, the system circuit 3 receives the first data signal DS1 from the magnetic circuit 12 and further sends the first data signal DS1 to the smart device 4 for performing a smart control. In one example, the system circuit 3 includes a chip having capabilities of high-performance computation and data-processing (e.g. a CPU) adapted to control the smart device 4 to perform tasks. In another example, the system circuit 3 may be a system applied with AI edge computing. In an implementation, the smart device 4 includes smart lamps, an IP CAM, etc. However, the present disclosure is not limited to the above example. In another example, the smart device 4 generates a second data signal DS2 (e.g. an image signal) and further sends the second data signal DS2 to the system circuit 3. In other words, a two-way data transmission can be performed between the system circuit 3 and the smart device 4. In the signal transmission device disclosed by the present disclosure, based on the characteristics of power signal transmission and data signals transmission provided by techniques of Ethernet power transmission, power and data can be transmitted to respective devices or systems, so that the use of the conventional power adapter is avoided. In other words, in the signal transmission device of the present disclosure, the Ethernet power transmission circuit, substituted for the conventional DC power adapter, is used with the magnetic circuit so as to achieve the effects of providing power and data. Thereby, both of the wastes of spaces and the costs for maintaining equipment are reduced.

Figure 3:
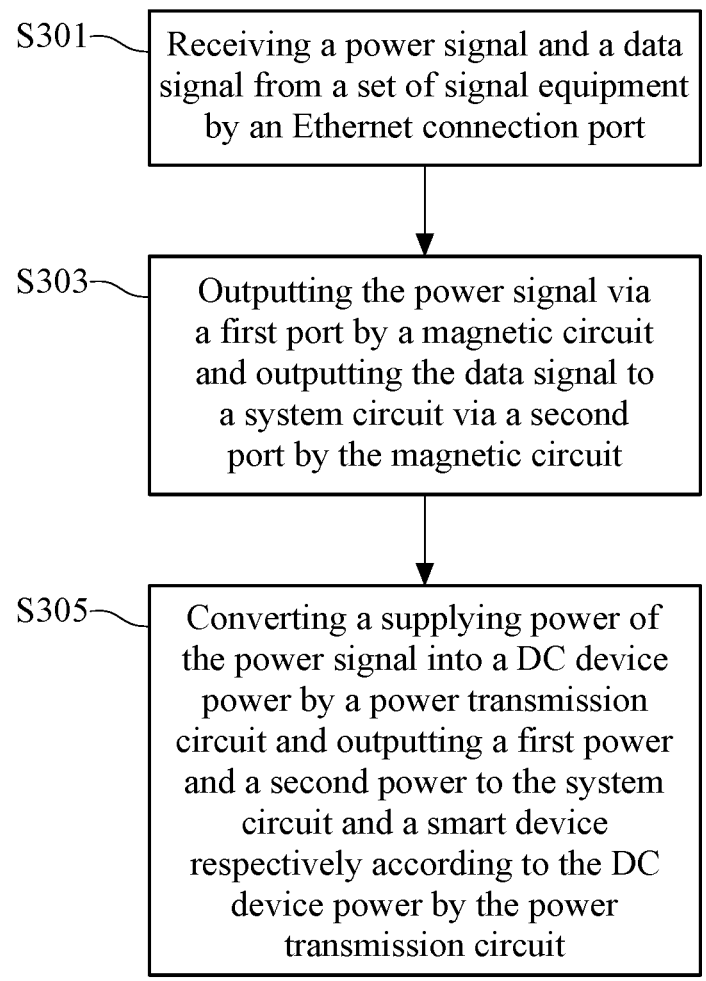
FIG. 3 is a flow chart of a signal transmission method according to one embodiment of the present disclosure.

Please refer to FIG. 3, which is a flow chart of a signal transmission method according to one embodiment of the present disclosure. The signal transmission method can be implemented by the signal transmission device 1 shown in FIG. 1 and FIG. 2. As shown in FIG. 3, in step S301, the power signal PS1 and the first data signal DS1 from the set of signal equipment 2 are received by the Ethernet connection port 10. In step S303, the power signal PS1 is outputted by the magnetic circuit 12 via the first port PT1, and the first data signal DS1 is outputted to the system circuit 3 by the magnetic circuit 12 via the second port PT2. In step S305, the supplying power of the power signal PS1 is converted into the DC device power DVQ by the power transmission circuit 14, and the first power E1 and the second power E2 are respectively outputted to the system circuit 3 and the smart device 4 by the power transmission circuit 14 according to the DC device power DVQ. In this embodiment, the voltage of the supplying power is greater than the voltage of the first power E1 and the voltage of the second power E2, and the first data signal DS1 is further sent from the system circuit 3 to the smart device 4.

Figure 4:
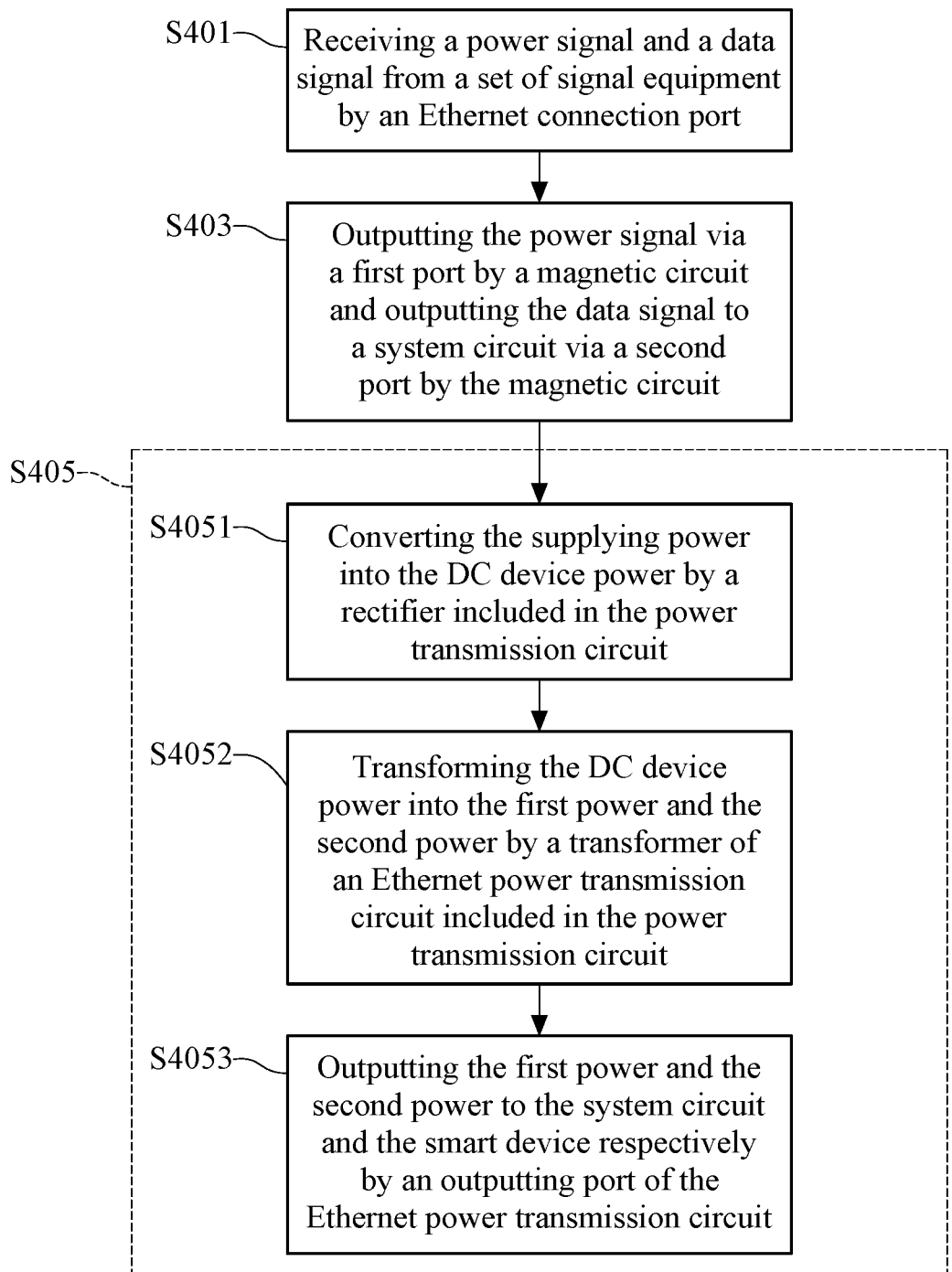
FIG. 4 is a flow chart of a signal transmission method according to another embodiment of the present disclosure.

Please refer to FIG. 4, which is a flow chart of a signal transmission method according to another embodiment of the present disclosure. Steps S401-S405 shown in FIG. 4 are similar to steps S301-S305 shown in FIG. 3. However, the step S405 shown in FIG. 4 includes steps S4051-S4053. In the step S4051, the supplying power is converted into the DC device power DVQ by the rectifier 141 of the power transmission circuit 14. In step S4052, the DC device power DVQ is transformed by the transformer 1431 of the Ethernet power transmission circuit 143 so that the first power E1 and the second power E2 are generated. In step S4053, the Ethernet power transmission circuit 143 respectively outputs the first power E1 and the second power E2 to the system circuit 3 and the smart device 4 via the outputting port PT3. The signal transmission methods shown in FIG. 3 and FIG. 4 are adapted to the signal transmission device 1 shown in FIG. 1 and FIG. 2. Operations related to FIG. 3 and FIG. 4 can be found in the aforementioned paragraphs, so the detailed descriptions regarding the operations of FIG. 3 and FIG. 4 are not repeated.

Figure 5:
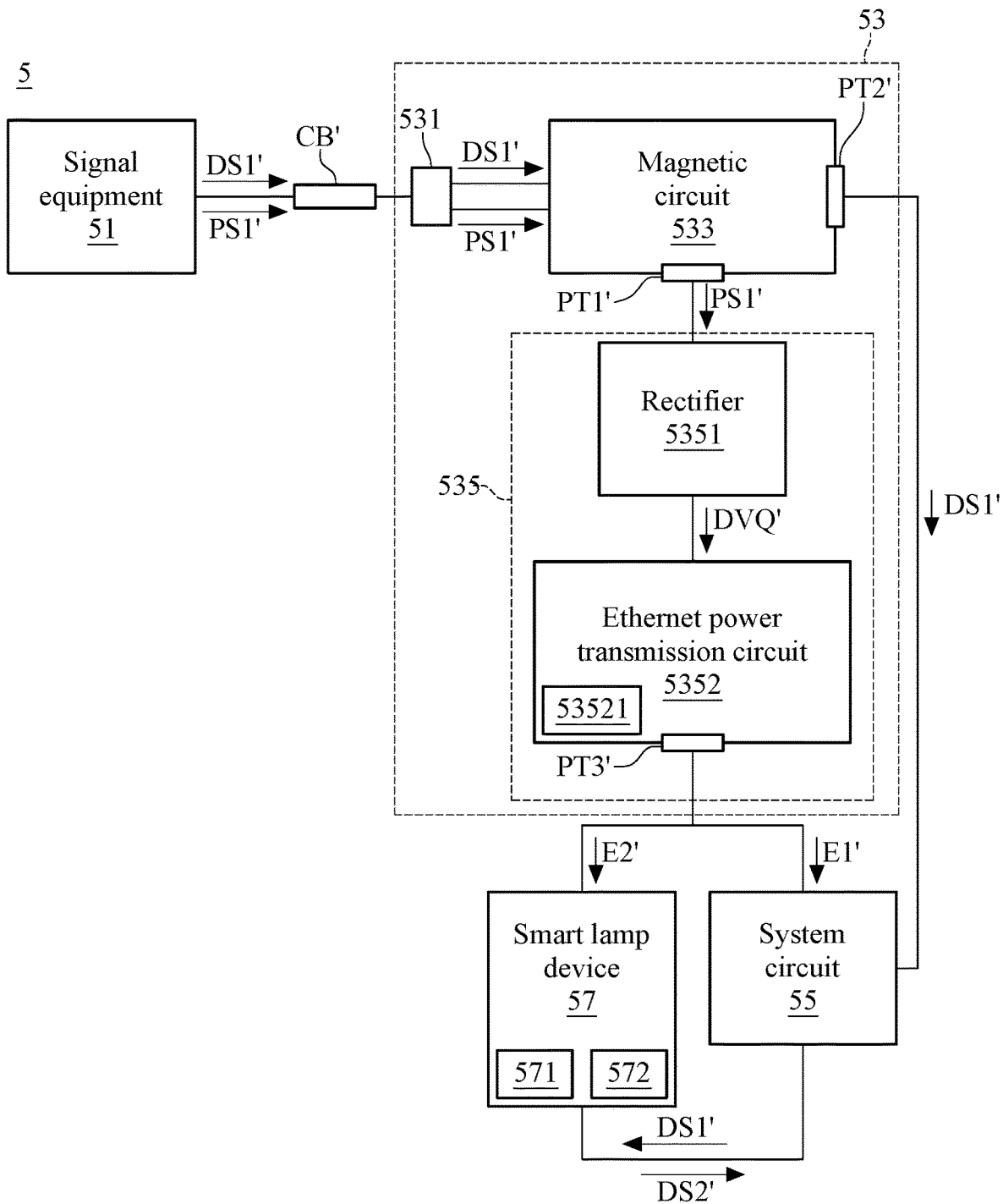
FIG. 5 is a block diagram of a smart lamp system according to one embodiment of the present disclosure.

Please refer to FIG. 5, which is a block diagram of a smart lamp system according to one embodiment of the present disclosure. As shown in FIG. 5, a smart lamp system 5 includes a set of signal equipment 51, a signal transmission device 53, a system circuit 55 and a smart lamp device 57. The set of signal equipment 51 is configured to provide a first data signal DS1' and a power signal PS1' having a supplying power. The signal transmission device 53 is electrically connected to the set of signal equipment 51. The signal transmission device 53 includes an Ethernet connection port 531, a magnetic circuit 533 and a power transmission circuit 535. The Ethernet connection port 531 is configured to be electrically connected to the set of signal equipment 51 and receive the power signal PS1' and the first data signal DS1' provided by the set of signal equipment 51. Specifically, the Ethernet connection port 531 is electrically connected to the set of signal equipment 51 through an Ethernet transmission cable CB'. The magnetic circuit 533 is electrically connected to the Ethernet connection port 531 and has a first port PT1' and a second port PT2'.

The magnetic circuit 533 is configured to output a power signal PS1' via the first port PT1' and output a first data signal DS1' via the second port PT2'. The power transmission circuit 535 is electrically connected to the first port PT1' and configured to convert the supplying power of the power signal PS1' into a DC device power DVQ' and further output a first power E1' and a second power E2' according to the DC device power DVQ'. The system circuit 55 is electrically connected to the power transmission circuit 535 and the second port PT2'. The system circuit 55 is configured to operate according to the first power E1' and receive the first data signal DS1'. The smart lamp device 57 is electrically connected to the power transmission circuit 535 and the system circuit 55. The smart lamp device 57, including a light-emitting element 571 and a camera 572, is configured to operate according to the second power E2'. The smart lamp device 57 receives the first data signal DS1' from the system circuit 55 so as to control the camera 572. In this embodiment, the operation of the signal transmission device 53 is similar to the operation of the signal transmission device 1 shown in FIG. 1 and FIG. 2, so the detailed descriptions about the operation of the signal transmission device 53 are not repeated.

In an implementation, the smart lamp device 57 is a set of lamp equipment disposed on a street and including one or more light-emitting elements (e.g. LEDs) and/or a photography device (e.g. an IP CAM). A conventional smart lamp system not only needs cables for smart controls, but also needs a DC power adapter for receiving DC power. As a result, the costs for maintaining equipment remain high and the wastes of spaces for the conventional smart lamp system are inevitable. The advantages of the smart lamp system 5 disclosed in the present disclosure lies in that a signal transmission device 53, substituting the conventional DC power adapter, is applied to achieve the purpose of transmitting power and data concurrently, and accordingly the cost for maintaining equipment and the wastes of spaces are reduced.

In one embodiment, the power transmission circuit 535 includes a rectifier 5351 and an Ethernet power transmission circuit 5352. The rectifier 5351 is electrically connected to the first port PT1'. The rectifier 5351 is configured to convert the supplying power into a DC device power DVQ' by performing a rectification conversion. The Ethernet power transmission circuit 5352 is electrically connected to the rectifier 5351. The Ethernet power transmission circuit 5352 includes an outputting port PT3' and a transformer 53521. The transformer 53521 is configured to transform the DC device power DVQ' by performing a buck-conversion so that the first power E1' and the second power E2' are generated. The Ethernet power transmission circuit 5352 respectively outputs the first power E1' and the second power E2' to the system circuit 55 and the smart lamp device 57 via the outputting port PT3'. In one embodiment, the system circuit 55 sends the first data signal DS1' to the smart lamp device 57, and the camera 572 in the smart lamp device 57 generate a second data signal DS2' (e.g. an image signal) and further sends the second data signal DS2' to the system circuit 3. In other words, a two-way data transmission can be performed between the system circuit 55 and the smart lamp device 57.

Based on the above descriptions, in the signal transmission device, the signal transmission method and the smart lamp system disclosed in the present disclosure, based on the characteristics of the power transmission and the data transmission of an Ethernet in the signal transmission device, power can be transmitted to a smart device (e.g. a smart lamp or a camera) and/or a smart system, and data signals can be transmitted for smart controls. Thereby, a use of a conventional power adapter can be avoided, and both of the costs for maintaining smart lamps and the wastes of spaces are reduced. Accordingly, the defects of a whole smart system in a smart city are overcome.

What is claimed is:
1. A signal transmission method, comprising:
receiving a power signal and a data signal from a set of signal equipment by an Ethernet connection port;
outputting the power signal via a first port by a magnetic circuit and outputting the data signal to a system circuit via a second port by the magnetic circuit; and
converting a supplying power of the power signal into a DC device power by a power transmission circuit and outputting a first power and a second power to the system circuit and a smart device respectively according to the DC device power by the power transmission circuit;

wherein a voltage of the supplying power is greater than a voltage of the first power and a voltage of the second power, and the data signal is sent from the system circuit to the smart device.

2. The signal transmission method according to claim 1, wherein converting the supplying power of the power signal into the DC device power by the power transmission circuit and outputting the first power and the second power to the system circuit and the smart device respectively comprising:

converting the supplying power into the DC device power by a rectifier included in the power transmission circuit;

transforming the DC device power into the first power and the second power by a transformer of an Ethernet power transmission circuit included in the power transmission circuit; and outputting the first power and the second power to the system circuit and the smart device respectively by an outputting port of the Ethernet power transmission circuit.

3. A smart lamp system, comprising:

a set of signal equipment configured to provide a first data signal and a power signal having a supplying power;

a signal transmission device, electrically connected to the set of signal equipment, comprising:

an Ethernet connection port configured to be electrically connected to the set of signal equipment and to receive the power signal and the first data signal provided by the set of signal equipment;

a magnetic circuit electrically connected to the Ethernet connection port, with the magnetic circuit having a first port and a second port, the magnetic circuit configured to output the power signal via the first port, and the magnetic circuit configured to output the first data signal via the second port; and a power transmission circuit electrically connected to the first port, with the power transmission circuit configured to convert the supplying power of the power signal into a DC device power, and the power transmission circuit configured to output a first power and a second power according to the DC device power;

a system circuit electrically connected to the power transmission circuit and the second port, with the system circuit configured to operate according to the first power and receive the first data signal via the second port; and a smart lamp device electrically connected to the power transmission circuit and the system circuit, with the smart lamp device comprising at least one light-emitting element and a camera and configured to operate according to the second power, and the lamp device configured to receive the first data signal from the system circuit to control the camera.

4. The smart lamp system according to claim 3, wherein the power transmission circuit comprises:

a rectifier electrically connected to the first port and configured to convert the supplying power into the DC device power; and an Ethernet power transmission circuit electrically connected to the rectifier, with the Ethernet power transmission circuit having an outputting port and a transformer, the transformer configured to transform the DC device power into the first power and the second power, and the Ethernet power transmission circuit configured to output the first power and the second power to the system circuit and the smart lamp device respectively via the outputting port.

5. The smart lamp system according to claim 3, wherein the camera of the smart lamp device is configured to generate a second data signal and to further send the second data signal to the system circuit.

* * * * *